United States Patent
Manda et al.

(10) Patent No.: US 10,642,348 B2
(45) Date of Patent: May 5, 2020

(54) DISPLAY DEVICE AND IMAGE DISPLAY METHOD

(71) Applicant: KYOCERA Document Solutions Inc., Osaka (JP)

(72) Inventors: Etsuko Manda, Osaka (JP); Yoichi Hiranuma, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/214,019

(22) Filed: Dec. 7, 2018

(65) Prior Publication Data

US 2019/0179406 A1 Jun. 13, 2019

(30) Foreign Application Priority Data

Dec. 11, 2017 (JP) .................... 2017-236771

(51) Int. Cl.
| | |
|---|---|
| G06F 3/01 | (2006.01) |
| G06F 1/16 | (2006.01) |
| H04M 1/725 | (2006.01) |
| G06F 3/041 | (2006.01) |
| G06F 3/0484 | (2013.01) |
| G06F 3/0488 | (2013.01) |

(52) U.S. Cl.
CPC ........... *G06F 3/011* (2013.01); *G06F 1/1637* (2013.01); *G06F 3/0412* (2013.01); *G06F 3/0416* (2013.01); *G06F 3/0484* (2013.01); *G06F 3/04883* (2013.01); *H04M 1/7253* (2013.01); *H04M 1/72544* (2013.01); *H04M 1/72583* (2013.01); *H04M 2250/22* (2013.01)

(58) Field of Classification Search
CPC ...... G06F 3/011; G06F 3/1637; G06F 3/0412; G06F 3/0416
USPC .................................................. 345/173, 174
See application file for complete search history.

(56) References Cited

U.S. PATENT DOCUMENTS

| | | | |
|---|---|---|---|
| 8,754,831 B2 | 6/2014 | Kollin et al. | |
| 9,110,502 B2 * | 8/2015 | Fink | ......................... G06F 3/012 |
| 2012/0272179 A1 * | 10/2012 | Stafford | ................... G06F 3/012 |
| | | | 715/781 |
| 2012/0293544 A1 * | 11/2012 | Miyamoto | ............... G06F 3/005 |
| | | | 345/620 |
| 2013/0033485 A1 | 2/2013 | Kollin et al. | |

(Continued)

FOREIGN PATENT DOCUMENTS

JP 2014-529094 A 10/2014

*Primary Examiner* — Calvin C Ma
(74) *Attorney, Agent, or Firm* — Studebaker & Brackett PC

(57) ABSTRACT

A display device includes a controller, a display, and a display controller. The controller generates an augmented reality image based on an image displayed on a screen of an external terminal display device and a size of a screen area of the screen. The augmented reality image corresponds to the image. The display displays the augmented reality image so that the image is viewed by a user through augmented reality. The display controller controls displaying by the display. The controller generates an augmented reality image including an excess region when a size of an overall area of the image is larger than the size of the screen area. The excess region is a portion of the overall area and corresponds to an excess from the size of the screen area. The display controller directs the display to display the excess region outside the screen area.

7 Claims, 11 Drawing Sheets

(56) References Cited

U.S. PATENT DOCUMENTS

2015/0338652 A1* 11/2015 Lim .................. G06K 9/00201
345/158
2018/0075658 A1* 3/2018 Lanier .................. G06T 19/006

* cited by examiner

DISPLAY DEVICE AND IMAGE DISPLAY METHOD

INCORPORATION BY REFERENCE

The present application claims priority under 35 U.S.C. § 119 to Japanese Patent Application No. 2017-236771, filed on Dec. 11, 2017. The contents of this application are incorporated herein by reference in their entirety.

BACKGROUND

The present disclosure relates to a display device and an image display method.

A known image display system displays a virtual image for viewing an image on a screen of a mobile device. An example of such an image display system displays a virtual image in a position at an apparent distance from a screen of a mobile device toward the back of the screen according to a distance between the eyes of a user and the screen. The image display system displays the virtual image more widely as the mobile device is moved closer to the eyes.

SUMMARY

A display device according to an aspect of the present disclosure includes a controller, a display, and a display controller. The controller generates an augmented reality image based on an image displayed on a screen of an external terminal display device and a size of a screen area of the screen. The augmented reality image corresponds to the image. The display displays the augmented reality image so that the image is viewed by a user through augmented reality. The display controller controls displaying by the display. The controller generates an augmented reality image including an excess region when a size of an overall area of the image is larger than the size of the screen area. The excess region is a portion of the overall area and corresponds to an excess from the size of the screen area. The display controller directs the display to display the excess region outside the screen area.

An image display method according to another aspect of the present disclosure includes implementation by a processor of generating an augmented reality image, displaying the augmented reality image, and controlling displaying the augmented reality image. In the generating an augmented reality image, the augmented reality image is generated based on an image displayed on a screen of an external terminal display device and a size of a screen area of the screen. The augmented reality image corresponds to the image. In the displaying the augmented reality image, the augmented reality image is displayed so that the image is viewed by a user through augmented reality. In the generating an augmented reality image, the processor generates an augmented reality image including an excess region when a size of an overall area of the image is larger than the size of the screen area. The excess region is a portion of the overall area and corresponds to an excess from the size of the screen area. In the controlling displaying the augmented reality image, the processor controls displaying the augmented reality image so that the excess region is displayed outside the screen area.

DETAILED DESCRIPTION

Figure 1A:
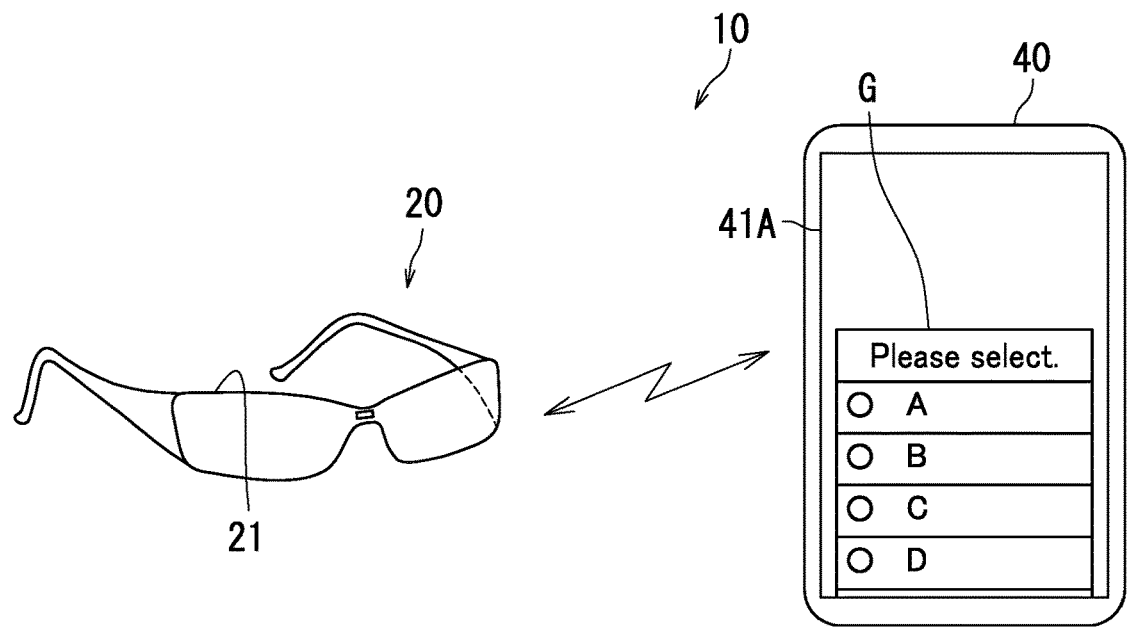
FIG. 1A is a diagram illustrating a display system according to an embodiment of the present disclosure.

The following describes an embodiment of the present disclosure with reference to the accompanying drawings. It should be noted that elements in the drawings that are the same or equivalent are labelled using the same reference signs and description thereof will not be repeated.

Figure 1B:
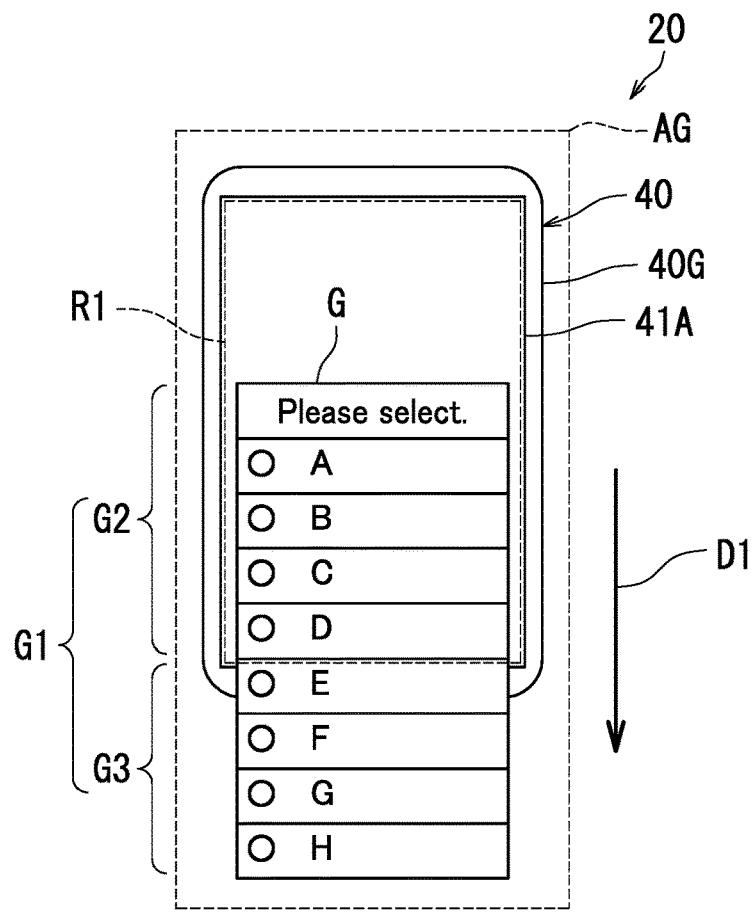
FIG. 1B is a diagram illustrating an image displayed on a display device according to the embodiment of the present disclosure.
Figure 2:
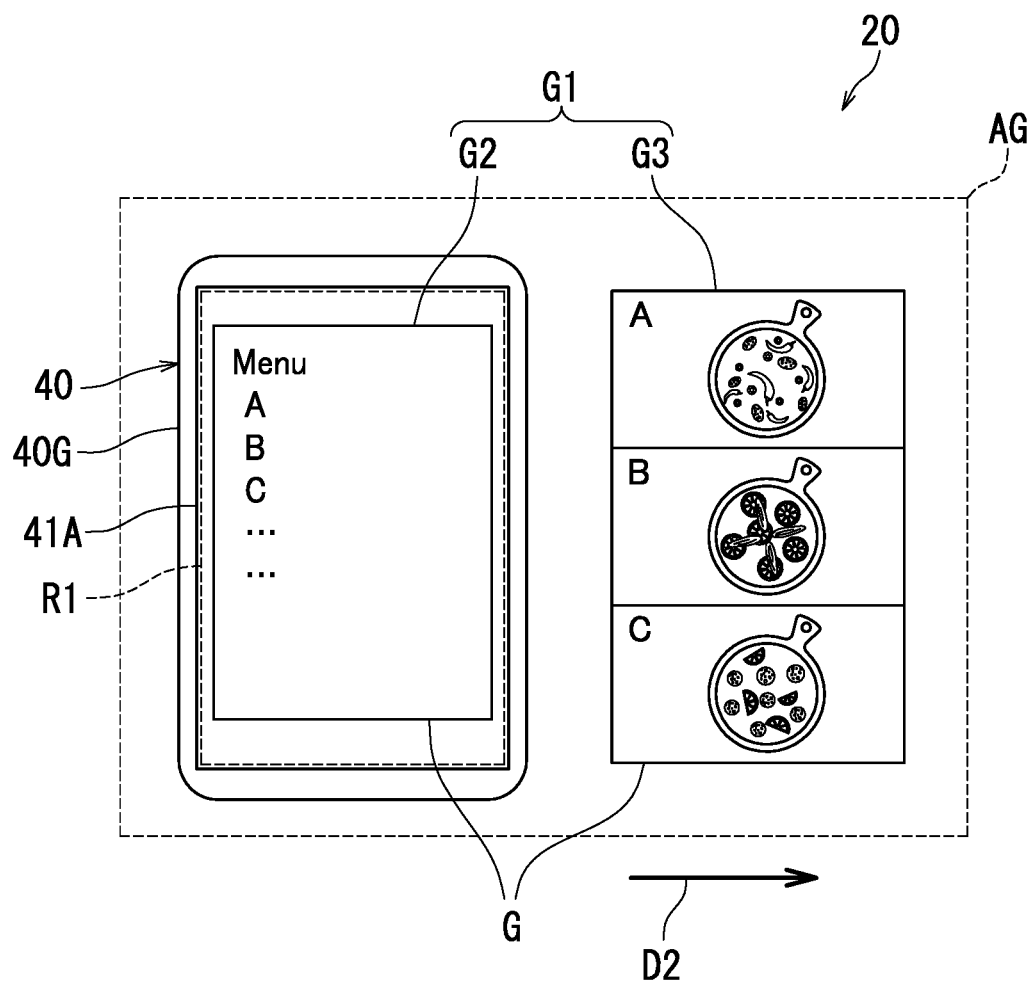
FIG. 2 is a diagram illustrating an image displayed on the display device according to the embodiment of the present disclosure.

A general configuration of a display system 10 according to the present embodiment will be described with reference to FIGS. 1A, 1B, and 2. FIG. 1A is a diagram illustrating the display system 10. FIGS. 1B and 2 are diagrams each illustrating an image displayed on a display device 20.

As illustrated in FIGS. 1A and 1B, the display system 10 includes the display device 20 and a terminal display device 40. The display device 20 is for example an optical see-through head mounted display or a smartphone. In the present specification, an example is described in which the display device 20 is a head mounted display. The terminal display device 40 is for example a smartphone or a tablet terminal. The terminal display device 40 may alternatively be a display device (for example, a touch panel including an operation screen) provided in an image forming apparatus (for example, a multifunction peripheral). In the present specification, an example is described in which the terminal display device 40 is a smartphone. The terminal display device 40 is equivalent to what is referred to as an "external terminal display device". The display device 20 is capable of wireless communication with the terminal display device 40. The display device 20 in the display system 10 displays an image G displayed on a screen 41A of the terminal display device 40 such that a user can view the image G through augmented reality (AR). At least a portion of an overall area G1 of the image G is displayed within a range of the screen 41A, which is physical, of the terminal display device 40 illustrated in FIG. 1A. The overall area G1 includes a plurality of regions. The plurality of regions may include a region that is not viewable at a glance due to size constraints of the physical screen 41A. The screen 41A is for example rectangular.

The display device 20 includes a controller, a display 21, and a display controller. The controller generates an augmented reality image AG corresponding to the image G based on the image G and a size of a screen area R1 of the screen 41A. The augmented reality image AG includes an image exhibiting the overall area G1 of the image G. The augmented reality image AG may further include a terminal image 40G exhibiting the terminal display device 40. The controller generates an augmented reality image AG including an excess region G3 when a size of the overall area G1 of the image G is larger than the size of the screen area R1. The excess region G3 is a portion of the overall area G1 and corresponds to an excess from the size of the screen area R1. The overall area G1 also includes a portion that falls within the screen area R1, and such a portion is also referred to below as a "non-excess region G2".

FIG. 1B illustrates an example in which the image G is a pull-down menu screen image. In such an example, the display 21 can display the excess region G3 downstream of the screen area R1 in a first direction D1, for example. The first direction D1 means a direction from an upper end of the screen 41A toward a lower end of the screen 41A along long sides of the screen 41A in a field of view of the user wearing the display device 20.

FIG. 2 illustrates an example in which the image G is a combination of an image of a menu listing food names with food pictures. In such an example, the display 21 can display the excess region G3 downstream of the screen area R1 in a second direction D2, for example. The second direction D2 means a direction from a left end of the screen 41A toward a right end of the screen 41A along short sides of the screen 41A in the field of view of the user wearing the display device 20. The terms "upper", "lower", "left", and "right" as used in the present specification are based on the field of view of the user.

As illustrated in FIGS. 1B and 2, the display controller controls displaying by the display 21. The display controller directs the display 21 to display the excess region G3 outside the screen area R1 once the controller has generated the augmented reality image AG including the excess region G3. The display 21 displays the augmented reality image AG. As described above, the display controller expands an area for displaying the augmented reality image AG according to the excess region G3. The user wearing the display device 20 sees the augmented reality image AG displayed on the display 21. Even when the user cannot view the overall area G1 including the excess region G3 at a glance within the range of the screen 41A of the terminal display device 40, therefore, the user can view the overall area G1 on the display 21 without the need for a particular operation. Thus, it is possible to improve convenience in displaying the image G displayed on the screen 41A of the terminal display device 40 through the augmented reality.

Figure 3:
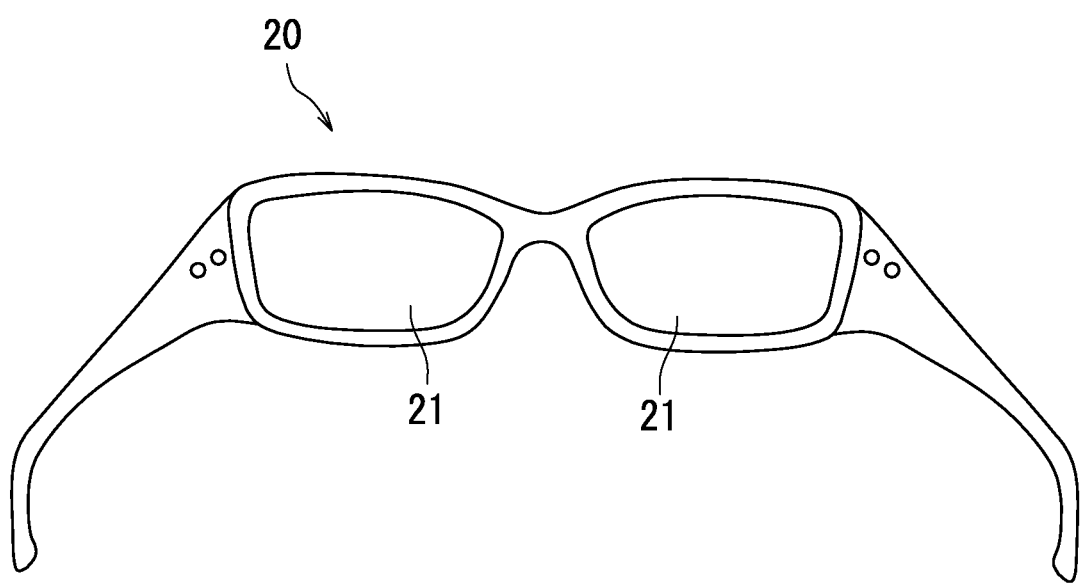
FIG. 3 is a diagram illustrating the display device according to the embodiment of the present disclosure.
Figure 4:
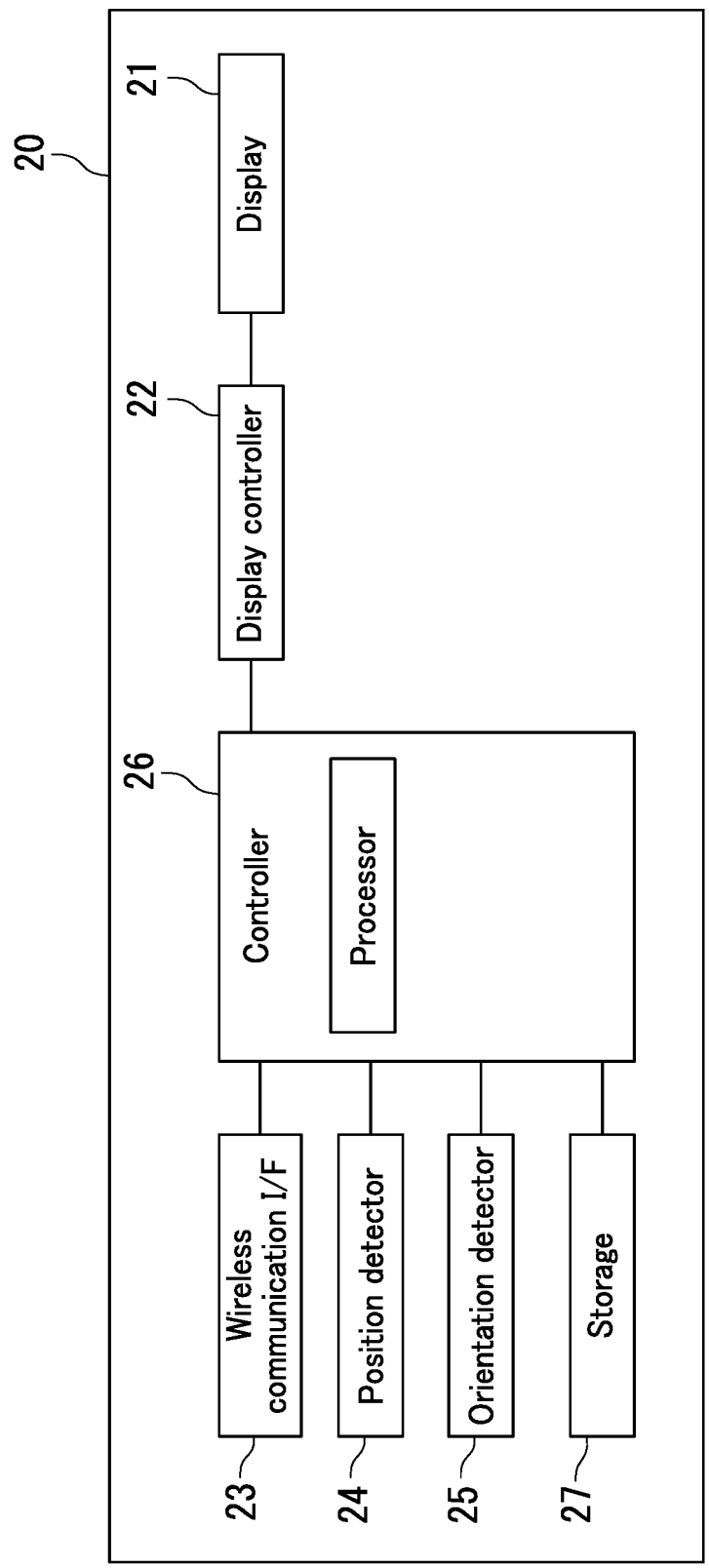
FIG. 4 is a diagram illustrating a configuration of the display device according to the embodiment of the present disclosure.

The following describes a configuration of the display device 20 in detail with reference to FIGS. 3 and 4 as well as FIGS. 1A and 2. FIG. 3 is a diagram illustrating the display device 20. Specifically, FIG. 3 illustrates the display device 20 as viewed from the face (eyes) of the user. In other words, FIG. 3 shows the inside of the display device 20.

As illustrated in FIG. 3, the display device 20 according to the present embodiment is binocular. Accordingly, the display device 20 includes two displays 21 (a display section) to be respectively placed in front of the left and right eyes (eyeballs) of the user. The two displays 21 display the same image. The displays 21 are each formed of a display element such as a liquid-crystal display or an organic electroluminescence (organic EL) display. The displays 21 have a vision area defining the field of view of the user. The vision area is preset on the displays 21. The vision area will be described in detail below with reference to FIGS. 8A to 10B.

FIG. 4 is a diagram illustrating the configuration of the display device 20. As illustrated in FIG. 4, the display device 20 includes a wireless communication interface (I/F) 23, a position detector 24, an orientation detector 25, and storage 27 in addition to the displays 21, a display controller 22, and a controller 26.

The wireless communication interface 23 is used for wireless communication between the display device 20 and the terminal display device 40. No particular limitations are placed on the wireless communication method. For example, a short-range wireless communication such as Bluetooth (registered Japanese trademark) may be adopted. The wireless communication interface 23 is connected to the terminal display device 40 through wireless communication, and then transmits information request signals to the terminal display device 40. The information request signals include a signal requesting terminal information and image information. The image information indicates the image G. The terminal information indicates attributes (for example, a device model and a size of the screen 41A) of the terminal display device 40. The wireless communication interface 23 receives the terminal information and the image information from the terminal display device 40. The wireless communication interface 23 also receives touch position information transmitted from the terminal display device 40. The touch position information indicates a touch position detected on the screen 41A. The touch position will be described in detail below with reference to FIGS. 5 to 7B.

The display controller 22 is controlled by the controller 26 and directs the displays 21 to display a specific image. Specifically, the display controller 22 is for example a drive circuit that drives the displays 21. The display controller 22 directs the displays 21 to display the augmented reality image AG within the vision area based on the image information and the terminal information transmitted from the terminal display device 40. Specifically, the display controller 22 directs the displays 21 to display the overall area G1 of the image G and the terminal image 40G in a stack. For example, as illustrated in FIGS. 1B and 2, the display controller 22 directs the displays 21 to display the overall area G1 farther front in the stack than the terminal image 40G such that the non-excess region G2 fits in a shape of the screen 41A.

The position detector 24 detects a current position of the display device 20. In other words, the position detector 24 detects a current position of the user wearing the display device 20. The position detector 24 for example has a GPS function.

The orientation detector 25 detects an orientation of the display device 20. In other words, the orientation detector 25 detects an orientation of the face of the user wearing the display device 20. The orientation detector 25 for example includes an electronic compass.

The controller 26 performs various processes such as numerical calculation, information processing, and device control by executing a program stored in the storage 27. The controller 26 can include a processor such as a central processing unit (CPU) or a micro processing unit (MPU).

The storage 27 stores therein programs and various data. The storage 27 also stores therein the image information transmitted from the terminal display device 40 and information of coordinates (a position) of the terminal display device 40. The storage 27 may for example include a magnetic disk of a hard disk drive (HDD), random access memory (RAM), and read only memory (ROM).

The controller 26 generates the augmented reality image AG corresponding to the image G based on the image G and the size of the screen area R1. Specifically, once the wireless communication interface 23 and the terminal display device 40 have been connected through wireless communication, the controller 26 directs the wireless communication interface 23 to transmit the information request signal to the terminal display device 40. The controller 26 determines whether or not the size of the overall area G1 of the image G is larger than the size of the screen area R1 based on the image information and the terminal information received from the terminal display device 40. The controller 26 generates the augmented reality image AG including the excess region G3 when the size of the overall area G1 of the image G is larger than the size of the screen area R1. The controller 26 generates the augmented reality image AG including the non-excess region G2 when the size of the overall area G1 of the image G is not larger than the size of the screen area R1. The controller 26 controls the display controller 22 so that the displays 21 display the augmented reality image AG.

According to the present embodiment, as described above with reference to FIGS. 1A to 4, the augmented reality image AG can include the overall area G1 and the terminal image 40G. The display controller 22 displays the overall area G1 and the terminal image 40G in a stack as the augmented reality image AG. The user can therefore feel as if the user were seeing the overall area G1 on the physical screen 41A through the augmented reality without adjusting the orientation of the displays 21 toward the screen 41A of the terminal display device 40. This makes an action of seeing the image G displayed on the screen 41A less cumbersome.

Figure 5:
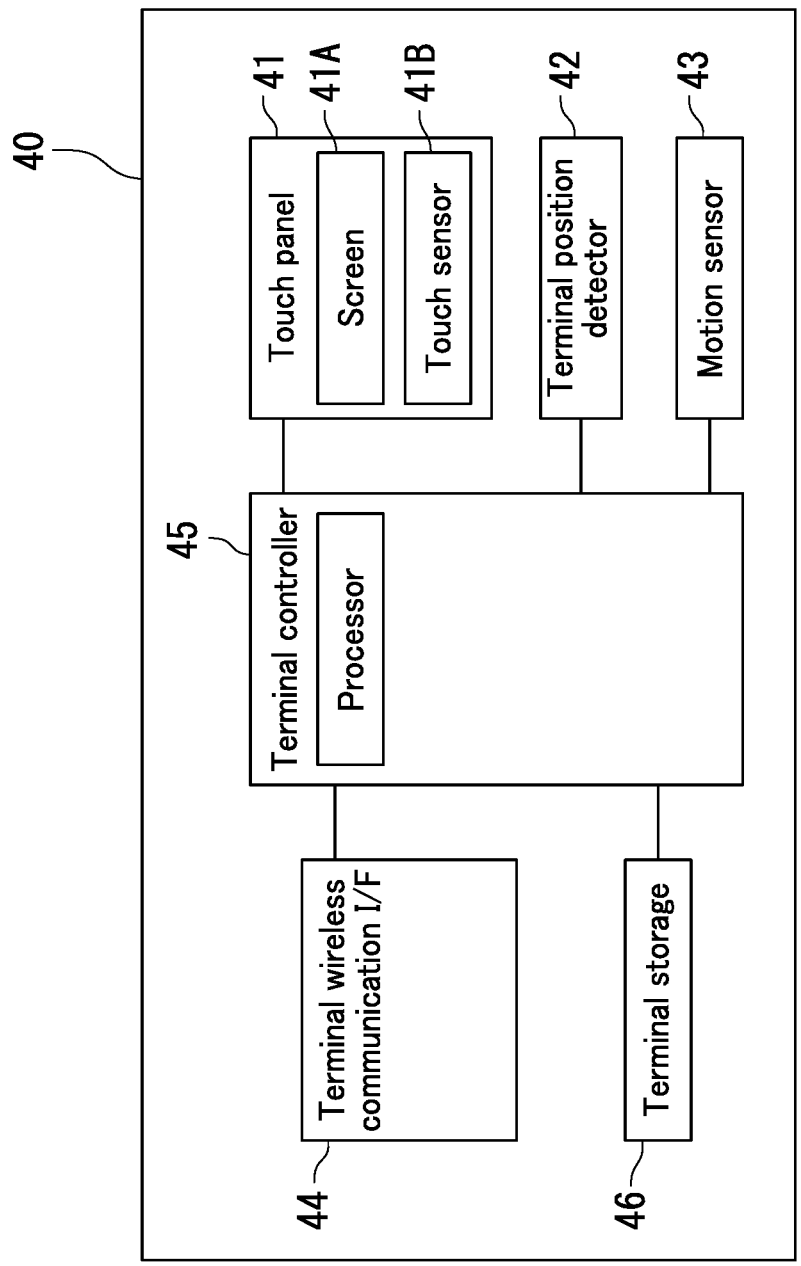
FIG. 5 is a diagram illustrating a configuration of a terminal display device according to the embodiment of the present disclosure.

The following describes a configuration of the terminal display device 40 and the touch position in detail with reference to FIGS. 5 to 7B. FIG. 5 is a diagram illustrating the configuration of the terminal display device 40. FIGS. 6A to 6C, 7A, and 7B are diagrams each illustrating an image displayed on the display device 20 (an image displayed by the displays 21). As illustrated in FIG. 5, the terminal display device 40 includes a touch panel 41, a terminal position detector 42, a motion sensor 43, a terminal wireless communication interface (I/F) 44, a terminal controller 45, and terminal storage 46.

The touch panel 41 includes the screen 41A and a touch sensor 41B. The terminal display device 40 performs a process corresponding to an operation performed on the touch panel 41 by the user.

The screen 41A is for example a liquid-crystal display. Alternatively, the screen 41A may be an organic electroluminescence display (organic EL display). The screen 41A has a display surface. The screen 41A displays objects such as operation icons for operating the terminal display device 40. The screen 41A also displays the image G. The image G is for example an image exhibiting an Internet site or an image exhibiting either or both of a document and a photograph.

The touch sensor 41B has a touch surface. The touch surface is disposed over the display surface of the screen 41A. Upon detecting a touch on the touch surface, the touch sensor 41B generates a touch position signal indicating a position of the touch. The touch position signal is output to the terminal controller 45. The touch sensor 41B is for example a resistive touch sensor. Alternatively, the touch sensor 41B may be an electrostatic capacitive touch sensor.

The terminal position detector 42 is for example a GPS receiver. The terminal position detector 42 receives radio waves from GPS satellites to acquire information indicating a current position of the terminal display device 40. The terminal position detector 42 periodically outputs terminal position information indicating the acquired position (coordinates) to the terminal controller 45. The terminal position information indicates longitude and latitude of the position of the terminal display device 40.

The motion sensor 43 detects motion of the terminal display device 40 and transmits information indicating the motion of the terminal display device 40 (motion information) to the terminal controller 45. The motion sensor 43 includes an acceleration sensor and a gyroscope.

The terminal wireless communication interface 44 is used for wireless communication between the terminal display device 40 and the display device 20. That is, the terminal wireless communication interface 44 adopts the same wireless communication method as the wireless communication interface 23 of the display device 20.

The terminal storage 46 stores therein programs, the terminal information, and the image information. For example, the terminal storage 46 stores information indicating various images G. The terminal storage 46 may for example include a magnetic disk of a HDD, RAM, and ROM.

The terminal controller 45 performs various processes such as numerical calculation, information processing, and device control by executing a program stored in the terminal storage 46. The terminal controller 45 may for example include a processor such as a CPU or an MPU.

Upon the terminal wireless communication interface 44 receiving the information request signal from the display device 20, the terminal controller 45 transmits either or both of the terminal information and the image information stored in the terminal storage 46 to the display device 20 through the terminal wireless communication interface 44. Note that the terminal controller 45 may periodically transmit the image information to the display device 20 through the terminal wireless communication interface 44. The terminal controller 45 may also transmit the terminal position information output from the terminal position detector 42 to the display device 20 through the terminal wireless communication interface 44. The terminal controller 45 also transmits the touch position information indicating the touch position to the display device 20 through the terminal wireless communication interface 44 in response to the touch position signal output from the touch sensor 41B.

The display controller 22 of the display device 20 directs the displays 21 to change the augmented reality image AG being displayed, based on the touch position detected on the screen 41A. For example, the display device 20 displays the augmented reality image AG by sliding the overall area G1 or scaling the overall area G1 according to the touch position information transmitted from the terminal display device 40.

Figure 6A:
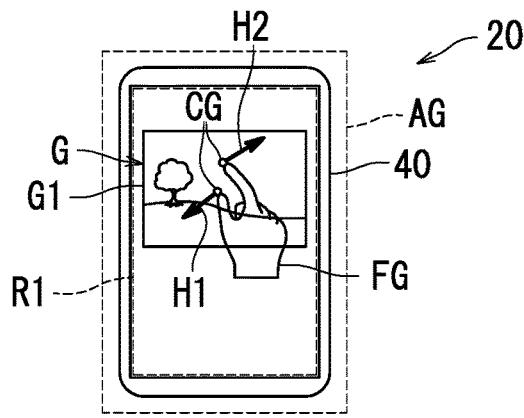
FIGS. 6A to 6C are diagrams each illustrating an image displayed on the display device according to the embodiment of the present disclosure.
Figure 6B:
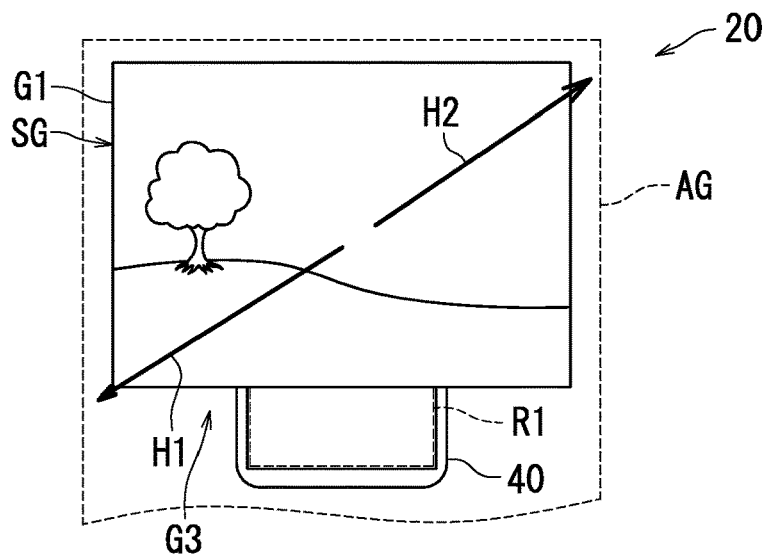
Figure 6C:
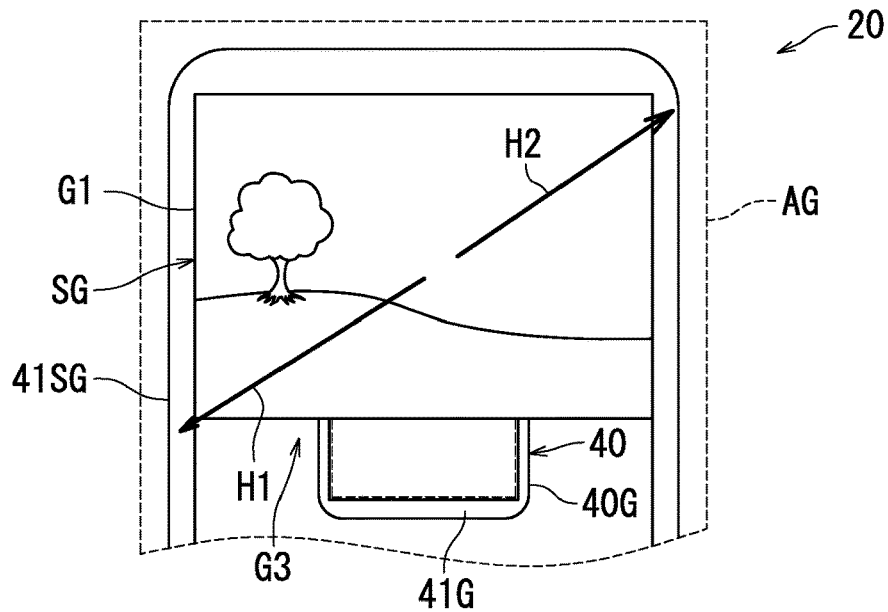

For example, the display device 20 displays the augmented reality image AG by enlarging the overall area G1 as illustrated in FIGS. 6A to 6C. Specifically, for example, the display device 20 displays two touch position images CG as illustrated in FIG. 6A according to touch position information indicating two touch positions. The display device 20 may display a finger image FG exhibiting fingers together with the touch position images CG. Upon detecting a movement of the touch positions corresponding to the two touch position images CG in an operation direction H1 and an operation direction H2 (a pinch-out operation), the touch sensor 41B outputs a corresponding touch position signal to the terminal controller 45. The terminal controller 45 transmits touch position information indicating the pinch-out operation to the display device 20 through the terminal wireless communication interface 44.

Based on the touch position information, the display controller 22 directs the displays 21 to display a scaled image SG obtained by scaling the image G. For example, the display controller 22 enlarges the overall area G1 in the operation direction H1 and the operation direction H2 according to the received touch position information and displays the augmented reality image AG including the excess region G3 as illustrated in FIG. 6B. For inputting a pre-defined instruction (for example, clicking) on the excess region G3, the user may for example input an instruction (for example, flicking or scrolling) on the touch sensor 41B to move the finger image FG to a position in the excess region G3.

Furthermore, the display controller 22 may direct the displays 21 to display a scaled bezel image 41SG as illustrated in FIG. 6C according to a size of the scaled image SG. The scaled bezel image 41SG is an image obtained by scaling a bezel image 41G. The terminal image 40G can include the bezel image 41G. The bezel image 41G exhibits a bezel of the screen 41A.

Figure 7A:
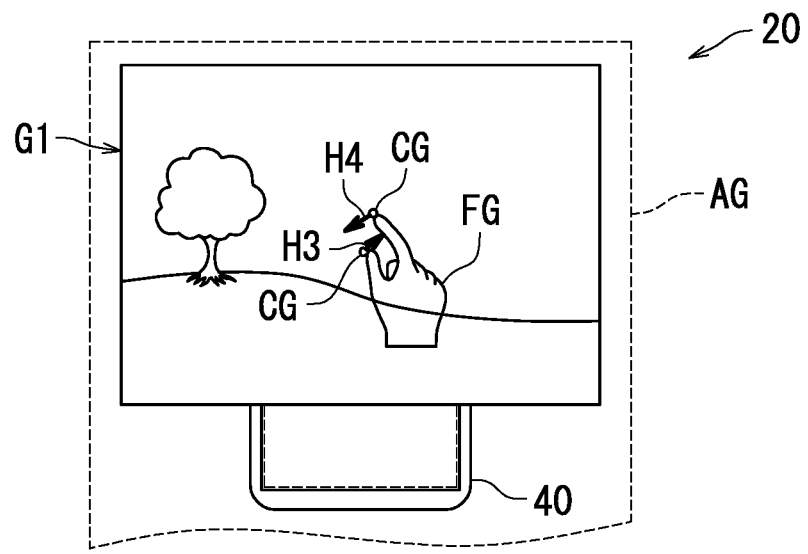
FIGS. 7A and 7B are diagrams each illustrating an image displayed on the display device according to the embodiment of the present disclosure.
Figure 7B:
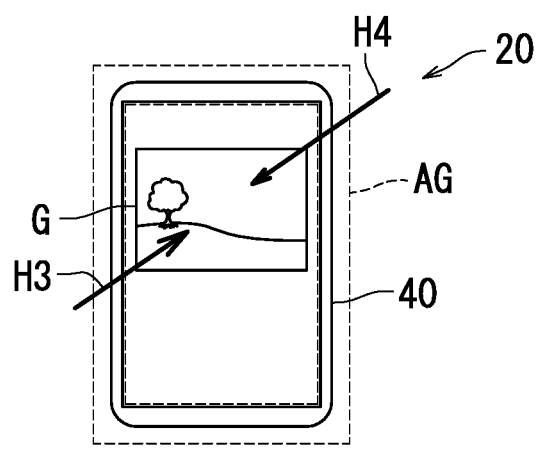

For another example, the display device 20 displays the augmented reality image AG by reducing the overall area G1 as illustrated in FIGS. 7A and 7B according to touch position information transmitted from the terminal display device 40. Upon detecting a movement of the touch positions corresponding to the two touch position images CG in an operation direction H3 and an operation direction H4 (a pinch-in operation), the touch sensor 41B outputs a corresponding touch position signal to the terminal controller 45. The terminal controller 45 transmits touch position information indicating the pinch-in operation to the display device 20 through the terminal wireless communication interface 44. The display controller 22 displays the augmented reality image AG by reducing the overall area G1 in the operation direction H3 and the operation direction H4 according to the received touch position information.

As described above with reference to FIGS. 5 to 7B, the display controller 22 according to the present embodiment directs the displays 21 to change the augmented reality image AG being displayed, based on the touch position detected on the screen 41A. Thus, the user can perform an operation on the overall area G1 of the image G by operating the touch sensor 41B. It is therefore possible to change the image both in the non-excess region G2 and in the excess region G3 through a simple configuration.

According to the present embodiment, the display controller 22 preferably directs the displays 21 to display the scaled bezel image 41SG according to the size of the scaled image SG. The user can intuitively perceive an actual scale of the scaled image SG by visually comparing the scaled image SG with the scaled bezel image 41SG.

Figure 8A:
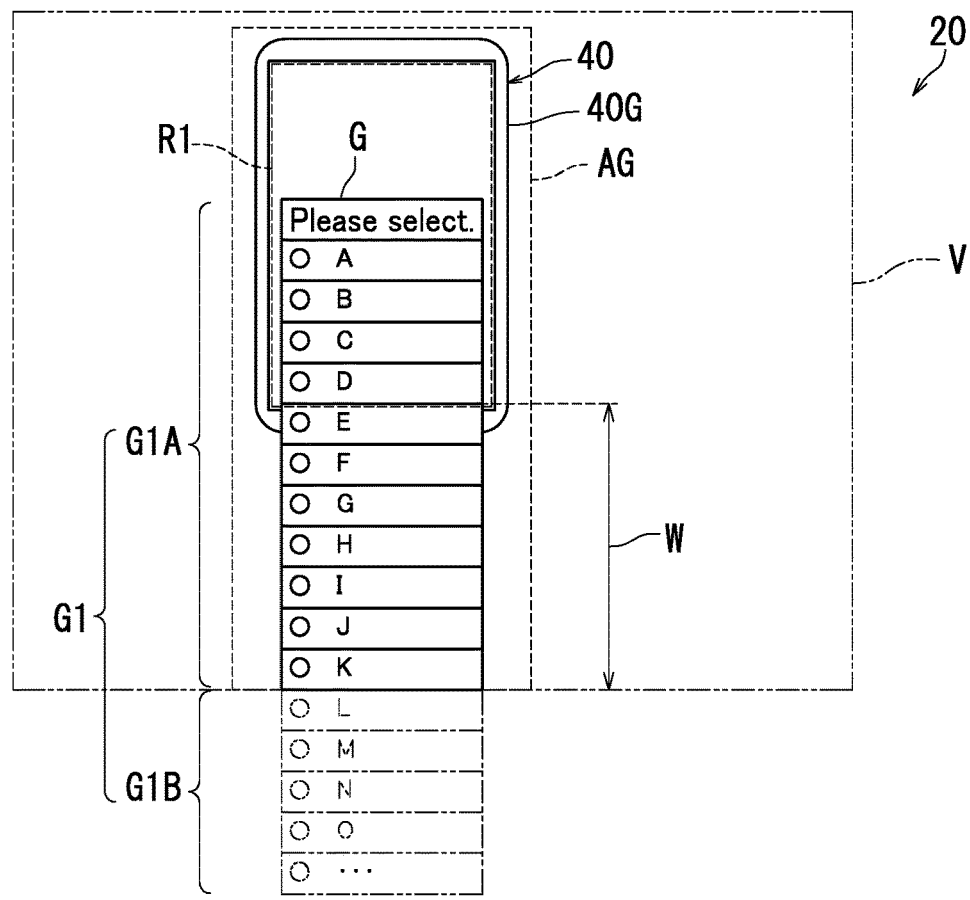
FIGS. 8A and 8B are diagrams each illustrating an image displayed on the display device according to the embodiment of the present disclosure.

The following describes the vision area V in detail with reference to FIGS. 8A to 10B. FIGS. 8A to 10B are diagrams each illustrating an image displayed on the display device 20. The display controller 22 directs the displays 21 to display the augmented reality image AG in the vision area V. Specifically, as illustrated in FIG. 8A, the vision area V means an area of the field of view observable by the user. The vision area V is preset on the displays 21 according to a screen size of the displays 21. The image G includes a first region G1A and a second region G1B. The second region G1B is continuous from (adjacent to) the first region G1A in the image G. The first region G1A and the second region G1B constitute the overall area G1.

Figure 8B:
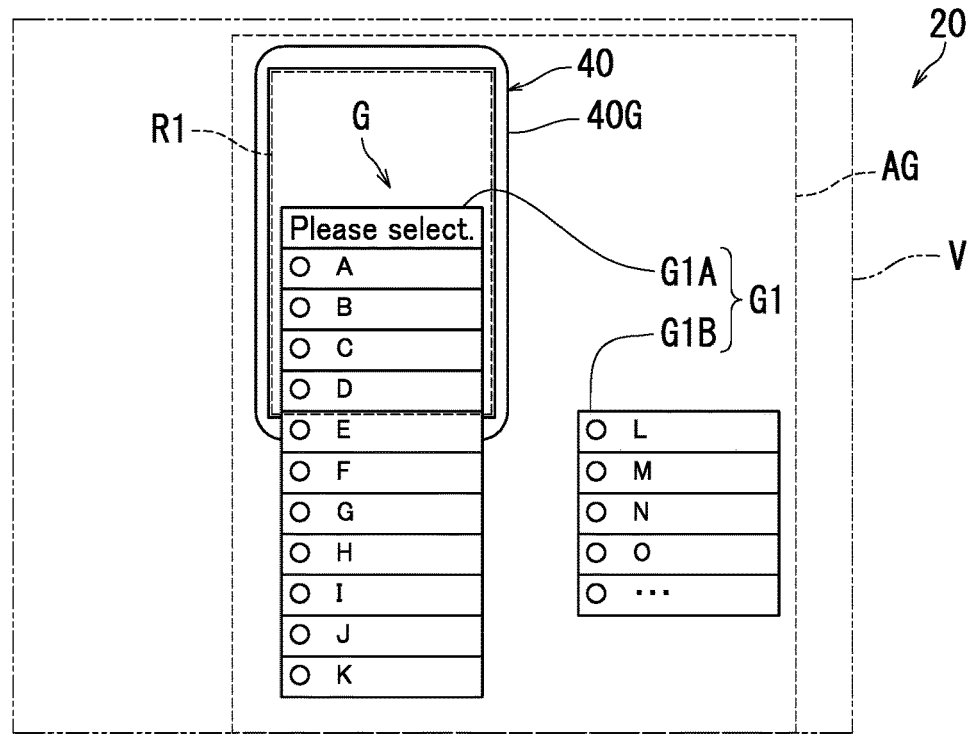

In a situation in which the second region G1B is protruding from the vision area V, the display controller 22 changes a position of the second region G1B so that the second region G1B is displayed within the vision area V. Specifically, the display controller 22 determines a boundary between the first region G1A and the second region G1B according to a distance W between an end of the screen area R1 and an end of the vision area V. That is, the display controller 22 uses the distance W as a threshold and determines a range of the first region G1A so that the first region G1A does not extend beyond the end of the screen area R1 by more than the distance W. For example, the display controller 22 separates the second region G1B from the first region G1A and causes the second region G1B to be displayed in the vicinity of the first region G1A within the vision area V as illustrated in FIG. 8B. The display controller 22 may display the terminal image 40G adjacent to a given end of the vision area V in order to minimize the second region G1B. Thus, in a situation in which the second region G1B is protruding from the vision area V, the display controller 22 changes the position of the second region G1B and directs the displays 21 to display the second region G1B within the vision area V instead of displaying the second region G1B in an original position in the image G. As described above, the displays 21 can display the augmented reality image AG according to the vision area V so that the user can view the augmented reality image AG at a glance. Thus, it is possible to further improve viewability of the image G displayed on the screen 41A of the terminal display device 40.

Figure 9:
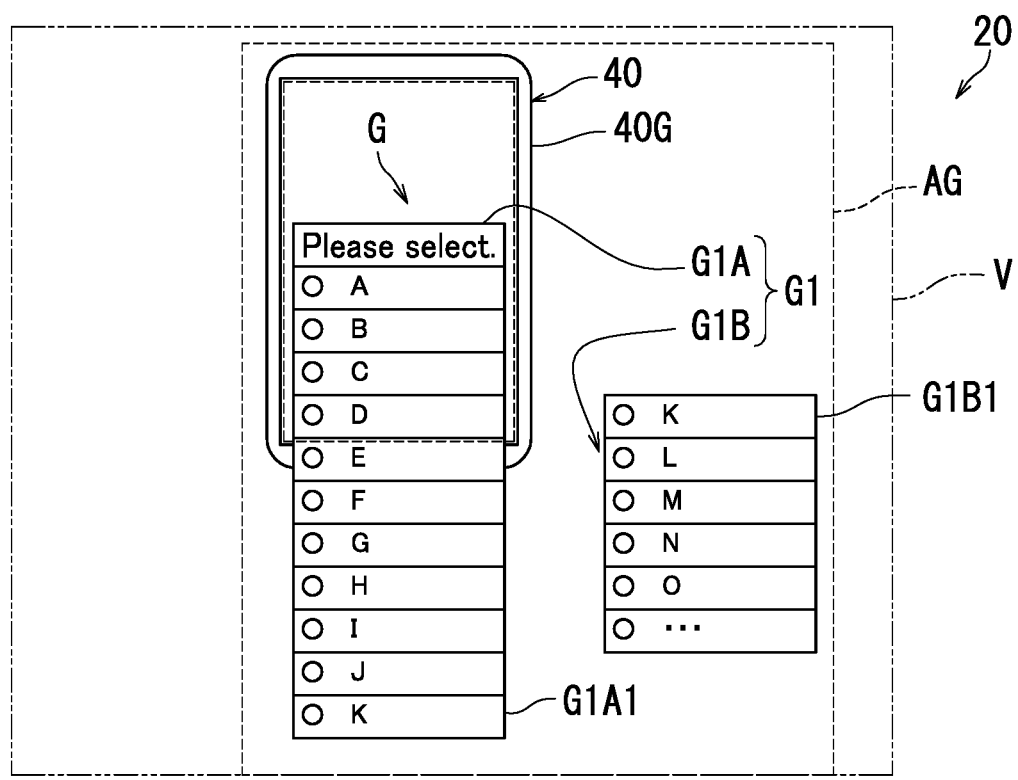
FIG. 9 is a diagram illustrating an image displayed on the display device according to the embodiment of the present disclosure.

Preferably, in a situation in which the second region G1B is protruding from the vision area V, the display controller 22 changes the position of the second region G1B so that the second region G1B is displayed within the vision area V together with a copy region G1B1 as illustrated in FIG. 9. Specifically, the first region G1A includes an end portion G1A1 located adjacent to the second region G1B. The copy region G1B1 exhibits the same image as the end portion G1A1. The user can easily recognize the end portion G1A1 located at an edge of the vision area V by seeing the copy region G1B1. Thus, the user viewing the image G displayed on the screen 41A of the terminal display device 40 can be prevented from missing fine details of the image G.

Figure 10A:
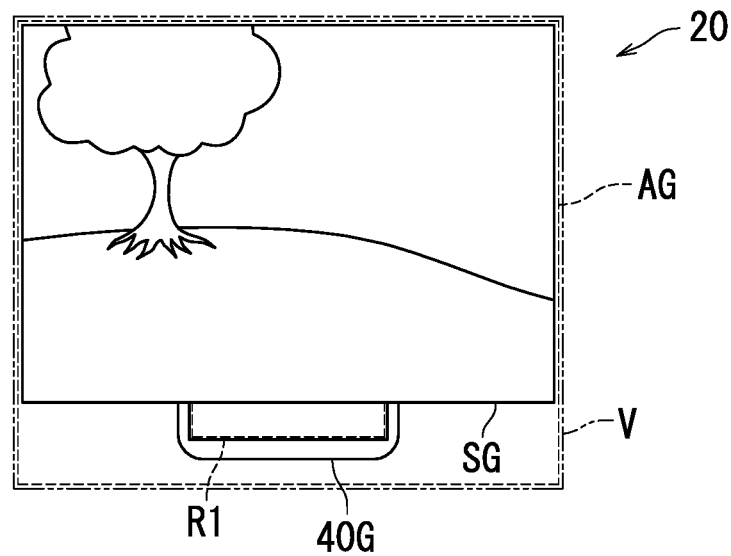
FIGS. 10A and 10B are diagrams each illustrating an image displayed on the display device according to the embodiment of the present disclosure.
Figure 10B:
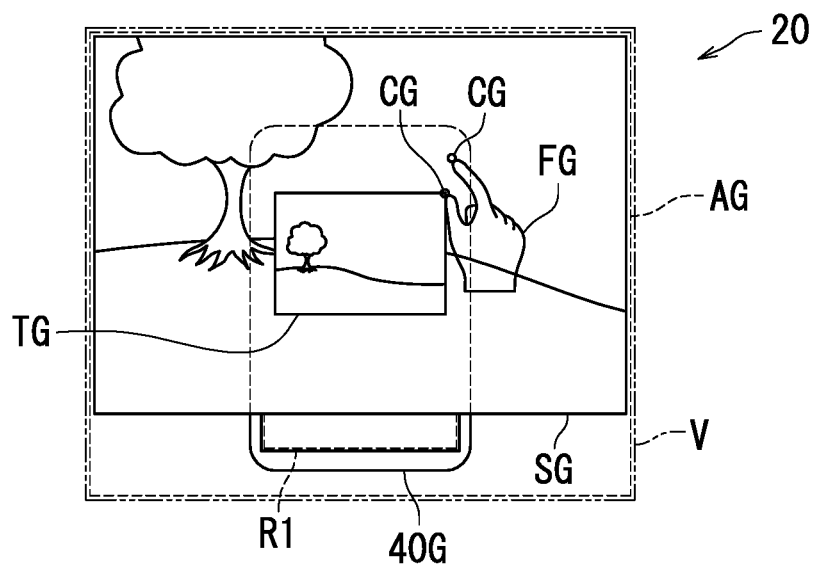

Preferably, as illustrated in FIGS. 10A and 10B, the display controller 22 directs the displays 21 to display a reference image TG over the scaled image SG based on a pre-defined touch position in a situation in which the pre-defined touch position is detected on the screen 41A after the scaled image SG has been displayed. Specifically, the reference image TG is equivalent to the image G before being scaled. The scaled image SG may be an image obtained by scaling down the image G or an image obtained by scaling up the image G as illustrated in FIG. 10A.

The pre-defined touch position is detected on the touch sensor 41B after the scaled image SG has been displayed. The pre-defined touch position is for example two touch positions representing a pinch-in operation as described with reference to FIG. 7A. The display device 20 receives touch position information indicating the pre-defined touch position from the terminal display device 40.

The display controller 22 directs the displays 21 to display the reference image TG over the scaled image SG as well as two touch position images CG corresponding to the touch position information as illustrated in FIG. 10B. The displays 21 may display the terminal image 40G and display the reference image TG within the screen area R1. As described above, for example, the user hoping to reduce the scaled image SG after excessively enlarging the image G beyond the vision area V can visually refer to the size of the image G before being enlarged. The user can therefore intuitively estimate the degree of rescaling for the scaled image SG to be rescaled.

Figure 11:
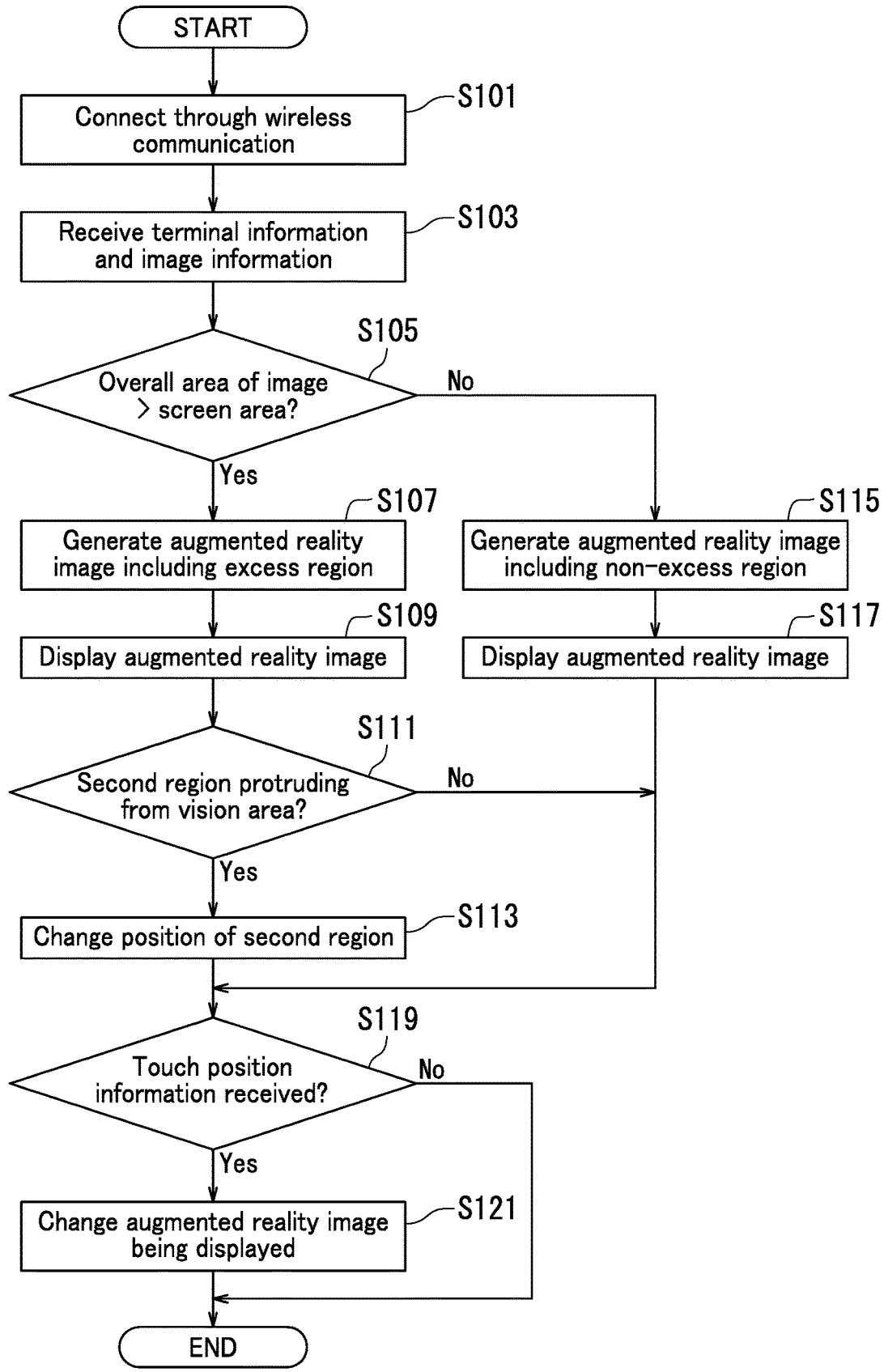
FIG. 11 is a flowchart illustrating a displaying process to be performed by the display device according to the embodiment of the present disclosure.

The following describes operation of the display system 10 with reference to FIGS. 1A to 11. FIG. 11 is a flowchart illustrating an example of a displaying process to be performed by the display device 20. The display device 20 performs the process of displaying the augmented reality image AG through Steps S101 to S121. Specific description is given below.

In Step S101, the display device 20 is connected to the terminal display device 40 through wireless communication. The display device 20 transmits the information request signal to the terminal display device 40. The process then advances to Step S103.

Next, in Step S103, the display device 20 receives the terminal information and the image information from the terminal display device 40. The process then advances to Step S105.

Next, in Step S105, the controller 26 determines whether or not the overall area G1 of the image G is larger than the screen area R1 of the screen 41A. Upon the controller 26 determining that the overall area G1 is larger than the screen area R1 (yes in Step S105), the process advances to Step S107. Upon the controller 26 determining that the overall area G1 is not larger than the screen area R1 (no in Step S105), the process advances to Step S115.

When no in Step S105, the controller 26 generates an augmented reality image AG including the non-excess region G2 in Step S115. The process then advances to Step S117.

Next, in Step S117, the display controller 22 directs the displays 21 to display the augmented reality image AG. The process then advances to Step S119.

When yes in Step S105, the controller 26 generates an augmented reality image AG including the excess region G3 in Step S107. The process then advances to Step S109.

Next, in Step S109, the display controller 22 directs the displays 21 to display the augmented reality image AG. The process then advances to Step S111.

Next, in Step S111, the controller 26 determines whether or not the second region G1B is protruding from the vision area V. Upon the controller 26 determining that the second region G1B is protruding from the vision area V (yes in Step S111), the process advances to Step S113. Upon the controller 26 determining that the second region G1B is not protruding from the vision area V (no in Step S111), the process advances to Step S119.

When yes in Step S111, the display controller 22 changes the position of the second region G1B so that the second region G1B is displayed within the vision area V in Step S113. The process then advances to Step S119.

Next, in Step S119, the controller 26 determines whether or not the touch position information has been received from the terminal display device 40. Upon the controller 26 determining that the touch position information has been received (yes in Step S119), the process advances to Step S121. Upon the controller 26 determining that the touch position information has not been received (no in Step S119), the process ends.

When yes in Step S119, the display controller 22 directs the displays 21 to change the augmented reality image AG being displayed, according to the touch position information in Step S121. The process then ends.

Through the above, an embodiment of the present disclosure has been described with reference to the drawings (FIGS. 1A to 11). However, the present disclosure is not limited to the above embodiment and may be practiced in various forms without deviating from the gist thereof. Elements of configuration in a plurality of embodiments can be combined as appropriate to form various disclosures. For example, some of the elements of configuration in different embodiments may be omitted. Furthermore, elements of configuration in different embodiments may be combined as appropriate. The drawings schematically illustrate elements of configuration in order to facilitate understanding, and properties of elements of configuration illustrated in the drawings, such as thickness, length, number, and spacing, may differ from actual properties thereof in order to facilitate preparation of the drawings. Furthermore, properties of elements of configuration described in the above embodiment, such as shape and direction, are merely examples and are not intended as specific limitations. The properties may be altered within a scope not substantially deviating from the configuration of the present disclosure.

(1) The display device 20 described with reference to FIGS. 1A and 3 is a binocular head mounted display, but the present disclosure is not limited as such. The display device 20 may alternatively be a mobile terminal (for example, a smartphone) capable of performing an augmented reality display process of displaying the augmented reality image AG. In an embodiment in which the display device 20 is a mobile terminal, a user may wear the mobile terminal as the display device 20 on the head using a mounting aid such as GOOGLE CARDBOARD (registered Japanese trademark) or hold the mobile terminal in front of the eyes with a hand using no aid.

(2) The vision area V described with reference to FIGS. 8A to 10B is preset on the displays 21 according to the screen size of the displays 21, but the present disclosure is not limited as such. The vision area V may be set based on a gaze direction of the user. In such an embodiment, the display device 20 further includes an eye image acquiring section and a gaze direction detector. The eye image acquiring section for example has a near-infrared light emitting diode (LED) and an infrared camera. The eye image acquiring section is disposed so as to acquire images of the left and right eyes (eyeballs) of the user (eye images). The gaze direction detector detects the gaze direction of the user by for example a corneal reflex method based on the acquired eye images. The display controller 22 determines a threshold for a range of the vision area V with respect to the user and sets the vision area V on the displays 21 based on the detected gaze direction. According to such an embodiment, it is possible to adjust the range of the vision area V for the gaze direction which varies among different users. As a result, the display device 20 has increased versatility.

(3) The display device 20 described with reference to FIGS. 1A to 11 is an optical see-through head mounted display, but the present disclosure is not limited as such. The display device 20 may for example be a video see-through head mounted display. The video see-through display device 20 may include an environment image acquiring section and a target identifying section in addition to the above-described eye image acquiring section and the above-described gaze direction detector. The environment image acquiring section acquires an image of an environment surrounding the user (surrounding environment image). The controller 26 analyzes the surrounding environment image and determines presence or absence of the terminal display device 40 and presence or absence of an arm of the user in the surrounding environment image by matching processing. The target identifying section identifies the terminal display device 40 present in the field of view of the user (in the surrounding environment image) based on the coordinates of the terminal display device 40 transmitted from the terminal display device 40, the current position of the display device 20 detected by the position detector 24, and the orientation of the display device 20 detected by the orientation detector 25. The target identifying section further identifies a positional relationship between the terminal image 40G and an image of the arm of the user in the surrounding environment image. In a situation in which the image of the arm is located leftward of a center point of the terminal image 40G (in a situation in which it is likely that the terminal display device 40 is held with the left hand), for example, the display controller 22 preferably displays the excess region G3 to the right of the terminal image 40G. This increases convenience in performing an operation on the excess region G3 with a hand not holding the terminal display device 40.

What is claimed is:

1. A display device comprising:
 a controller configured to generate an augmented reality image based on an image displayed on a screen of an external terminal display device and a size of a screen area of the screen, the augmented reality image corresponding to the image;
 a display configured to display the augmented reality image so that the image is viewed by a user through augmented reality; and
 a display controller configured to control displaying by the display, wherein
 the controller generates an augmented reality image including an excess region when a size of an overall area of the image is larger than the size of the screen area,
 the excess region is a portion of the overall area and corresponds to an excess from the size of the screen area,
 the display controller directs the display to display the excess region outside the screen area,
 the display has a vision area defining a field of view of the user,
 the display controller directs the display to display the augmented reality image within the vision area,
 the image includes a first region and a second region continuous from the first region,
 the first region and the second region constitute the overall area,
 in a situation in which the second region is protruding from the vision area, the display controller changes a position of the second region so that the second region is displayed within the vision area, and
 when changing the position of the second region so that the second region is displayed within the vision area, the display controller determines a boundary between the first region and the second region by determining a range of the first region according to a distance between an end of the screen area and an end of the vision area, and causes the second region to be displayed within the vision area with the second region separated from the first region.

2. The display device according to claim 1, wherein
 the augmented reality image includes the overall area and a terminal image exhibiting the external terminal display device, and
 the display controller directs the display to display the overall area and the terminal image in a stack.

3. The display device according to claim 1, wherein
 the first region includes an end portion adjacent to the second region, and
 in a situation in which the second region is protruding from the vision area, the display controller changes the position of the second region so that the second region is displayed within the vision area together with a copy region exhibiting the same image as the end portion.

4. The display device according to claim 1, wherein
 the display controller directs the display to change the augmented reality image being displayed, based on a touch position detected on the screen.

5. The display device according to claim 4, wherein
 the display controller directs the display to display a scaled image obtained by scaling the image based on the touch position, and
 in a situation in which a pre-defined touch position is detected on the screen after the scaled image has been displayed, the display controller directs the display to display a reference image over the scaled image based on the pre-defined touch position, the reference image exhibiting the image before being scaled.

6. The display device according to claim 5, wherein
 the augmented reality image includes a terminal image exhibiting the external terminal display device,
 the terminal image includes a bezel image exhibiting a bezel of the screen, and
 the display controller directs the display to display a scaled bezel image obtained by scaling the bezel image according to a size of the scaled image.

7. An image display method comprising implementation by a processor of:
 generating an augmented reality image based on an image displayed on a screen of an external terminal display device and a size of a screen area of the screen, the augmented reality image corresponding to the image;
 displaying the augmented reality image so that the image is viewed by a user through augmented reality; and
 controlling displaying the augmented reality image, wherein
 in the generating an augmented reality image, the processor generates an augmented reality image including an excess region when a size of an overall area of the image is larger than the size of the screen area,
 the excess region is a portion of the overall area and corresponds to an excess from the size of the screen area, and
 in the controlling displaying the augmented reality image, the processor controls displaying the augmented reality image so that the excess region is displayed outside the screen area,
 the displaying the augmented reality image includes displaying, by a display, the augmented reality image, the display having a vision area defining a field of view of the user,
 in the controlling displaying the augmented reality image, the processor directs the display to display the augmented reality image within the vision area,
 the image includes a first region and a second region continuous from the first region, the first region and the second region constitute the overall area, in the controlling displaying the augmented reality image, in a situation in which the second region is protruding from the vision area, the processor changes a position of the second region so that the second region is displayed within the vision area, and when changing the position of the second region so that the second region is displayed within the vision area, the processor determines a boundary between the first region and the second region by determining a range of the first region according to a distance between an end of the screen area and an end of the vision area, and causes the second region to be displayed within the vision area with the second region separated from the first region.

* * * * *